United States Patent
Hofmeister et al.

(10) Patent No.: US 7,434,259 B2
(45) Date of Patent: Oct. 7, 2008

(54) METHOD FOR PROMPTING A USER TO INSTALL AND EXECUTE AN UNAUTHENTICATED COMPUTER APPLICATION

(75) Inventors: Nicholas Milton Hofmeister, Seattle, WA (US); Ryan Walter Jason Waite, Seattle, WA (US); Kevin John Savage, Sammamish, WA (US); Miguel A. Claudio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 10/427,383

(22) Filed: Apr. 29, 2003

(65) Prior Publication Data

US 2004/0078565 A1   Apr. 22, 2004

Related U.S. Application Data

(60) Provisional application No. 60/420,197, filed on Oct. 21, 2002.

(51) Int. Cl.
G08B 23/00 (2006.01)
G06F 7/04 (2006.01)
G06F 11/30 (2006.01)
G06F 12/14 (2006.01)

(52) U.S. Cl. ............ 726/22; 726/26; 713/164; 713/187

(58) Field of Classification Search ........ 713/164, 713/187; 726/11, 21–22, 24–26
See application file for complete search history.

(56) References Cited

U.S. PATENT DOCUMENTS 5,892,904 A * 4/1999 Atkinson et al. ............ 726/22

6,263,348 B1 * 7/2001 Kathrow et al. ............ 707/203
2002/0116627 A1 * 8/2002 Tarbotton et al. ........... 713/200

OTHER PUBLICATIONS

CastelCops—Downloads, pp. 1-3.*
ZoneAlarm Pro 3.0 Help files, labled as "ZoneAlarm Help".*
Neil Rubenking, Zone Labs's ZoneAlarm Pro 1.0 Jan. 2001, PC Magazine.*
Zone Labs: ZoneAlarm Pro Release History, pp. 1-13.*
Lynn Haber, "Client Server: Needed Security Battle Plan," Jun. 22, 1992 *Communications Week* (4 pages).
Keith Brown, "Introducing the Web Application Manager, Client Authentication Options, and Process Isolation," 2000 *MSDNMagazine* (10 pages).
Timothy Fisher, "J2EE Application Security: Container vs. Application-Managed Security," Jan. 1, 2002 *Java Developer's Journal* vol. 7 No. 1 (7 pages).

(Continued)

*Primary Examiner*—KimYen Vu
*Assistant Examiner*—Ponnoreay Pich
(74) *Attorney, Agent, or Firm*—Merchant & Gould; Ryan T. Grace

(57) ABSTRACT

The present invention prompts a user to accept, install and execute unauthenticated computer applications. When the user accepts the application, information relating to the application files may be added to a prompt exclusion list (PEL). In this way, further downloads or execution of the same applications may be performed without prompting the user. The integrity of the application is checked before it is run. If the integrity does not match the stored integrity, the application is terminated. A revocation list is maintained that denies any applications on the revocation list from executing even if they contain signed certificates and are from trusted sources.

14 Claims, 4 Drawing Sheets

OTHER PUBLICATIONS

Mitch Wagner, "Security Software Provides New Group Access Controls; Permeo Upgrades Security Software Platform, Adding Authentication and Other Security Features," Nov. 7, 2002 *InternetWeek* (1 page).

* cited by examiner

METHOD FOR PROMPTING A USER TO INSTALL AND EXECUTE AN UNAUTHENTICATED COMPUTER APPLICATION

CROSS REFERENCE TO RELATED APPLICATIONS

This application claims the benefit of U.S. Provisional Application Ser. No. 60/420,197, filed Oct. 21, 2002, the benefit of the earlier filing date of which is hereby claimed under 35 U.S.C. § 119 (e).

FIELD OF THE INVENTION

The present invention relates generally to software, and more particularly authentication of software.

BACKGROUND OF THE INVENTION

In today's computing age, mobile devices are achieving widespread use and great sophistication. In many instances, mobile devices can install and execute software applications that are much more advanced than in even recent years past. Many times, those software applications are installed while the mobile device is connected to a land-line network. However, today's technology even allows software applications to be downloaded over-the-air to some wireless mobile devices.

Wireless transmissions are at a higher risk of being intercepted or otherwise interfered with than their land-line counterparts. Accordingly, the industry is evolving ways to ensure the integrity of downloaded applications to prevent malicious code from being interjected into the transmission. One way in which to ensure the integrity of a download is by using digital certificates and signatures. These mechanisms enable a mobile device to determine that a package downloaded over-the-air (or otherwise) is actually the same package that was created by a trusted source. The digital certificates authenticate that the sender is a trusted source, and the digital signatures authenticate that the package has not been tampered with since being transmitted. Both are commonly used in security schemes.

Users often take advantage of the security provided by digital certificates and signatures. In many cases, however, these mechanisms are either not available or not necessary. Enforcing digital certificates and/or signatures helps to ensure security but at the sacrifice of not being able to install some applications. Not enforcing digital certificates and/or signatures enables the user to install applications, but at the risk of potentially malicious applications being loaded. An adequate solution to this dilemma has eluded those skilled in the art.

SUMMARY OF THE INVENTION

The present invention is directed at prompting a user to accept, install and execute unauthenticated computer applications. Briefly stated, before the application is installed or executed, the user is prompted with a dialog to the effect of: "The application is not signed, are you sure you want to run it?" If the user chooses "Yes" the application is run despite the fact that the file is unsigned.

According to one aspect of the invention, when the user accepts the file, information relating to the file may be added to a prompt exclusion list (PEL). In this way, further downloads or execution of the same files may be performed without prompting the user.

According to another aspect of the invention, the application is hashed to create a unique representation of the application.

According to yet another aspect of the invention, a revocation list is maintained that denies any files listed on the revocation list from executing even if they contain digital signatures.

DETAILED DESCRIPTION OF THE PREFERRED EMBODIMENT

The present invention is directed at prompting a user to accept, install and execute unauthenticated computer applications. Briefly stated, before the application is installed or executed, the user is prompted with a dialog to the effect of: "The application is not signed, are you sure you want to run it?" If the user chooses "Yes" the application is run despite the fact that the file is unsigned. When the user accepts the file, information relating to the file may be added to a prompt exclusion list (PEL). In this way, further downloads or execution of the same files may be performed without prompting the user. A revocation list may also be maintained that denies any files listed on the revocation list from executing even if they contain signed certificates.

Figure 1:
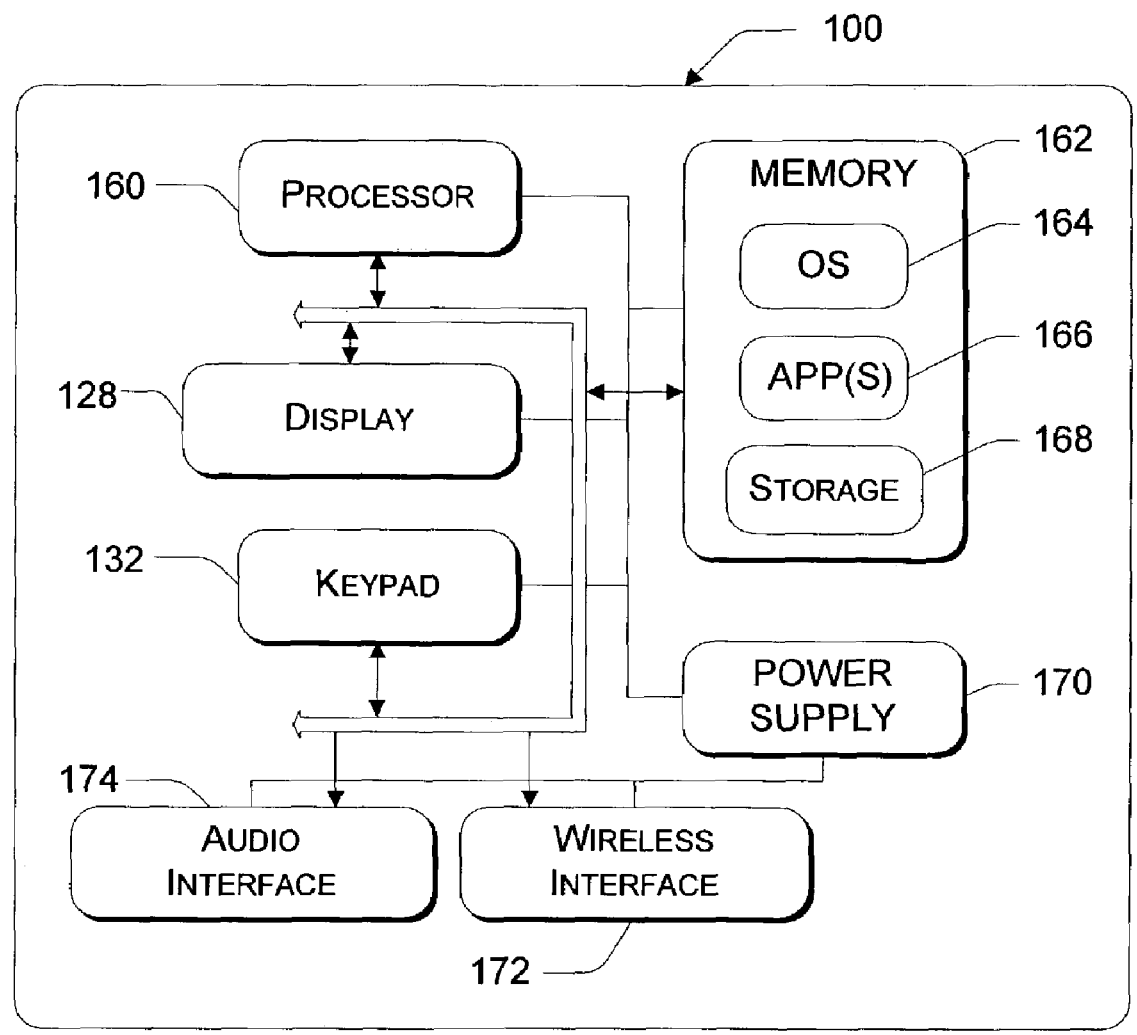
FIG. 1 illustrates an exemplary mobile computing device.

FIG. 1 illustrates a mobile computing device that may be used in one exemplary embodiment of the present invention. Mobile computing device 100 includes processor 160, memory 162, display 128, keypad 13, audio interface 174, wireless interface 172, and power supply 170. Memory 162 generally includes both volatile memory (e.g., RAM) and non-volatile memory (e.g., ROM, Flash Memory, or the like). As illustrated, mobile computing device 100 includes operating system 164, such as the Windows CE operating system from Microsoft Corporation or other operating system, which is resident in memory 162 and executes on processor 160. Keypad 132 may be a push button numeric dialing pad (such as on a typical telephone), a multi-key keyboard (such as a conventional keyboard), or some other input device. Display 128 may be a liquid crystal display, or any other type of display commonly used in mobile computing devices. Display 128 may be touch-sensitive, and would then also act as an input device.

One or more application programs 166 are loaded into memory 162 and run on operating system 164. Examples of application programs include phone dialer programs, email programs, scheduling programs, PIM (personal information management) programs, word processing programs, spreadsheet programs, Internet browser programs, and so forth. Mobile computing device 100 also includes non-volatile storage 168 within memory 162. Non-volatile storage 168 may be used to store persistent information which should not be lost if mobile computing device 100 is powered down. Applications 166 may use and store information in storage 168, such as e-mail or other messages used by an e-mail application, contact information used by a PIM, appointment information used by a scheduling program, documents used by a word processing application, and the like. An authentication application also resides on mobile computing device 100 and is programmed for authentication of applications that may be signed or unsigned.

Mobile computing device 100 includes power supply 170, which may be implemented as one or more batteries. Power supply 170 might further include an external power source, such as an AC adapter or a powered docking cradle that supplements or recharges the batteries.

Mobile computing device 100 is shown with audio interface 174 that may be directly coupled to power supply 170 so that when activated, it remains on for a duration dictated by the notification mechanism even though processor 160 and other components might shut down to conserve battery power. Audio interface 174 is used to provide audible signals to and receive audible signals from the user. For example, audio interface 174 may be coupled to a speaker for providing audible output and to a microphone for receiving audible input, such as to facilitate a telephone conversation.

Mobile computing device 100 also includes wireless interface 172 that performs the function of transmitting and receiving communications, such as radio frequency communications. Wireless interface layer 172 facilitates wireless connectivity between mobile computing device 100 and other nodes, via a communications carrier or service provider. Transmissions to and from wireless interface layer 172 may be conducted under control of operating system 164. In other words, communications received by wireless interface 172 may be disseminated to application programs 166 via operating system 164, and vice versa.

Figure 2:
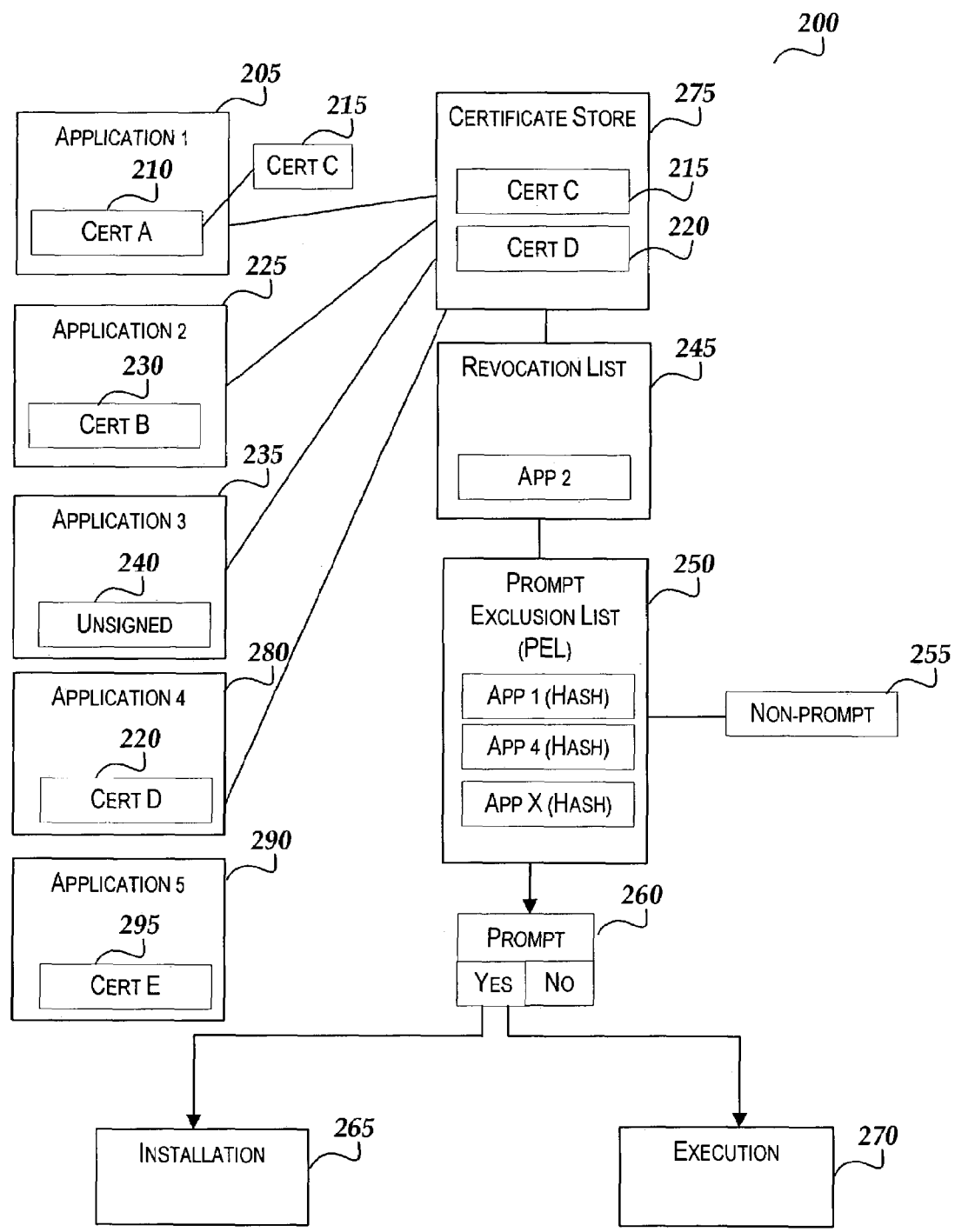
FIG. 2 is a functional block diagram generally illustrating an authentication system.

FIG. 2 is a functional block diagram generally illustrating an authentication system, in accordance with aspects of the present invention. Authentication system 200 is configured to determine when to install or execute files (applications) on a mobile device. In the embodiment illustrated, authentication system 200 is resident on a mobile device, such as mobile device 100 illustrated in FIG. 1.

A general description of authentication system will now be provided. Generally, when an action (installing the application or executing the application) associated with an application is requested, the authentication system determines if the action should be executed. Determining when to execute the action depends on many different items. For example, a Security Policy may be used to determine which of the authentication actions are taken and/or required. According to one embodiment of the invention, when the application is stored on revocation list 245, the action requested is not allowed and the application is terminated.

When the application is not on file revocation list 245, the certificates associated with the application are inspected. If the certificate associated with the application is in certificate store 275 then the file is executed without prompting the user. If the certificate hash is on the revoked list, execution of the file fails. According to one embodiment, the chain of certificates is walked completely. If any one of the certificates is revoked, execution fails.

The chain of certificates in the signature may also be checked against the Privileged Store and the Unprivileged Store. If a match is found in Privileged Store, the Secure Loader executes the application in Privileged Mode. If a match is not encountered in the Privileged Store, the signature is compared against the Unprivileged Store. (See FIG. 4 and related discussion).

If a match is found in Unprivileged Store, the Secure Loader executes the application in Unprivileged Mode. If the Unprivileged Store is empty or a match is not encountered, the application is treated as unsigned, and the user may be prompted.

When the certificate is not in certificate store 275, a prompt exclusion list (PEL) is checked to determine if the application has previously been approved. If so, the application is executed and no prompt is given to the user. If the application has not already been approved, the authentication system prompts the user to determine if the unauthenticated application should be executed. When the response to the prompt is "yes" then the application is executed (i.e. the application is installed or run). When the application is executed, the application is added to the PEL such that later action requests involving the application that have already been approved do not invoke a prompt.

According to one embodiment of the invention, the PEL is an ordered list of hashes of CABs and executables that is stored in the registry of the mobile device. The PEL is referenced each time an unsigned CAB or application is run when the appropriate security policies are enabled. The appropriate security policies may consist of turning on or off flags relating to the authentication system. If a hash of the CAB or executable already exists in the PEL, the user is not prompted. According to one embodiment, the hashes are computed with the SHA1 algorithm.

Given the relatively small lifetime size of this list of hashes, it is not necessary that the PEL is automatically trimmed or cleared at some particular time. Instead, the PEL may be maintained for the lifetime of the device. According to one embodiment, each application has one hash for the CAB plus one hash for each executable. Assume a maximum of average of five (5) total hashes per CAB. Each hash consumes 20 bytes meaning each application only uses 100 bytes. If space is needed, however, the PEL may be cleared or trimmed accordingly.

Examples relating to the installation or execution of application 1 (205), application 2 (225), and application 3 (235) will now be provided. The discussion will first look at exemplary application 1 (205). As illustrated, application 1 includes Certificate A (210) that references parent certificate C (215). As certificate C (215) is included in certificate store 275, and is not included in revocation list 245 (i.e. a trusted application), application 1 is allowed to run (install or execute) without first prompting the user to determine if the application should be trusted.

Turning now to application 2 it can be seen that application 2 includes certificate B. Application 2, however, is listed in revocation list 245 indicating that the application is not to be trusted. According to one embodiment, even if certificate B was included in certificate store 275, application 2 would not be allowed to run. As discussed above, applications listed in the revocation list are applications that can not be trusted.

Application 3 does not include a signed certificate, is not on the revocation list, and is not included in the PEL. As such, a prompt is provided to the user asking whether application 3 should be trusted ("accepted"). If the user responds no, the application is not executed. According to one embodiment, application 3 may also be added to the revocation list. If the user responds yes, the application is run and the application is added to the PEL such that the user will not be prompted in the future regarding running this application. Application 3, although unsigned, becomes a trusted application on the device.

Assume that application 4 is a CAB file that is signed, but some of its contents are not, then the user has not been prompted to accept the unsigned material, since the CAB itself was signed. For example, an unsigned DLL or EXE is referenced by application 4. When this situation is detected, authentication application 200 stops and prompts the user to determine whether or not to continue with application 4. If the user accepts the application, the application continues and the previously unaccepted material becomes accepted and part of the PEL. If the user rejects the application, the installation is canceled and all changes are rolled back. In the case where the CAB is not signed and the contents are not signed then the user is prompted once for the CAB. When the CAB is accepted the contents are also accepted. This saves the user from encountering two different prompts regarding the CAB and the contents.

As illustrated, application 5 is signed with a certificate (Certificate E), but Certificate E is not in the certificate store. In this case, application 5 is treated as unsigned and the user gets a prompt as to whether to accept or not.

Figure 3:
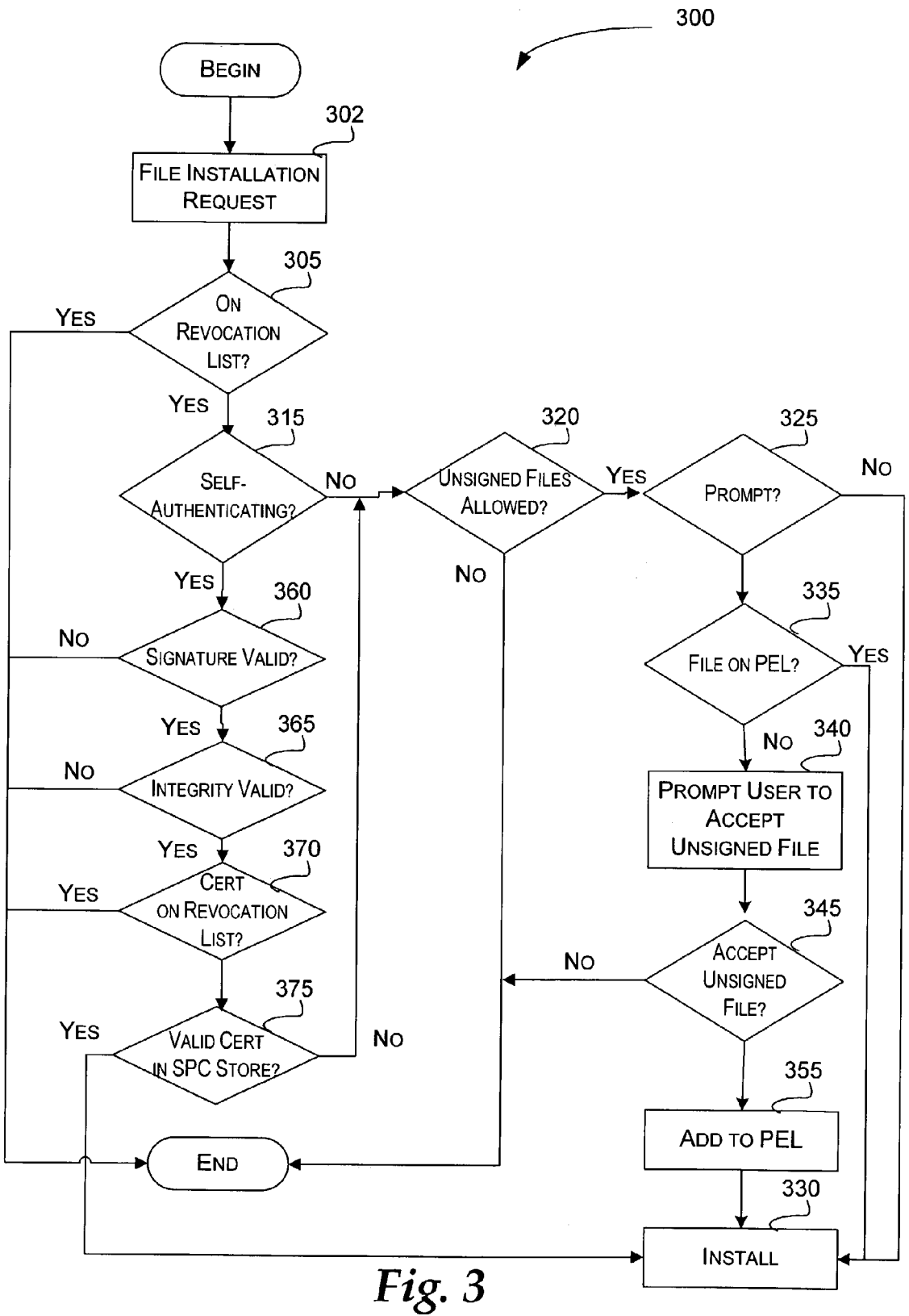
FIG. 3 is a flow chart that generally illustrates a process for installing an application from a received package file.

FIG. 3 is a flow chart that generally illustrates a process for installing an application from a received package file, in accordance with aspects of the invention.

At step 302, a request is made to install a received package file, such as a cab file, or the like. At decision block 305, a hash of the file (signed or unsigned) is checked against a revocation list. If the hash of the file is on the revocation list, the installation fails and moves to an end block and terminates. If the hash is not in the revocation list, the process flows to decision block 315 where a determination is made as to whether the file is signed with a certificate that is recognized by the device as valid, such as by digital signature and/or certificate. If not, the process continues to decision block 320. If the file is self-authenticating, the process continues to decision block 360.

At decision block 320, a determination is made whether unsigned files are allowed to run on the device. If not, installation fails and moves to an end block where the process terminates. If unsigned files are allowed, the process continues to decision block 325.

At decision block 325, a determination is made as to whether the user should be prompted to accept file installation despite the fact that the file is not self-authenticated. According to one embodiment, this determination may be made by checking a security setting indicating whether or not to prompt. If prompting is disabled, the file is installed at block 330 in accordance with local policy. If user prompting is enabled, however the process continues decision block 335.

At decision block 335, a determination is made whether the hash of the file is on a Prompt Exclusion List (PEL). If the file is on the PEL then the user has previously accepted the file and the file is installed at block 330 without prompting the user. If the file is not on the PEL, then, at block 340, the user is prompted to accept the unsigned file. At decision block 345, a determination is made whether the user accepted the unsigned file. If the user rejects the unsigned file, installation fails and moves to an end block. If the user accepts the unsigned file, the hash of the file and any unsigned executables associated with the application are added to the PEL at block 355. The process then moves to block 330 where the file is installed.

Returning to decision block 315, if the file is self-authenticating, the process continues to decision block 360 where the validity of the signature is verified. If the signature is not valid, installation fails and moves to an end block. If the signature is valid, the process moves to decision block 365 where the file's integrity is checked. According to one embodiment, the file integrity is checked in the following manner. The hash of the file is computed, and the hash of the file signed by the private key of the publishing certificate authority is extracted from the signature. The signed hash is decrypted using the public key of the certificate used to sign the file. The two hashes are compared to determine if they are identical. If the hashes are not identical, the file has been tampered with and the process moves to an end block where the installation fails. If the hashes are identical, the file remains intact and the process continues to decision block 370.

At decision block 370, a determination is made whether the certificate hash is on the security revocation list. If the certificate has been revoked, installation moves to an end block and fails. If the certificate has not been revoked, decision block 375 checks the chain of certificates in the signature against the SPC store. If a match is found, the file is installed at block 330 in accordance with policy. If a match is not found, the process continues to decision block 320, at which the process continues as described above.

Figure 4:
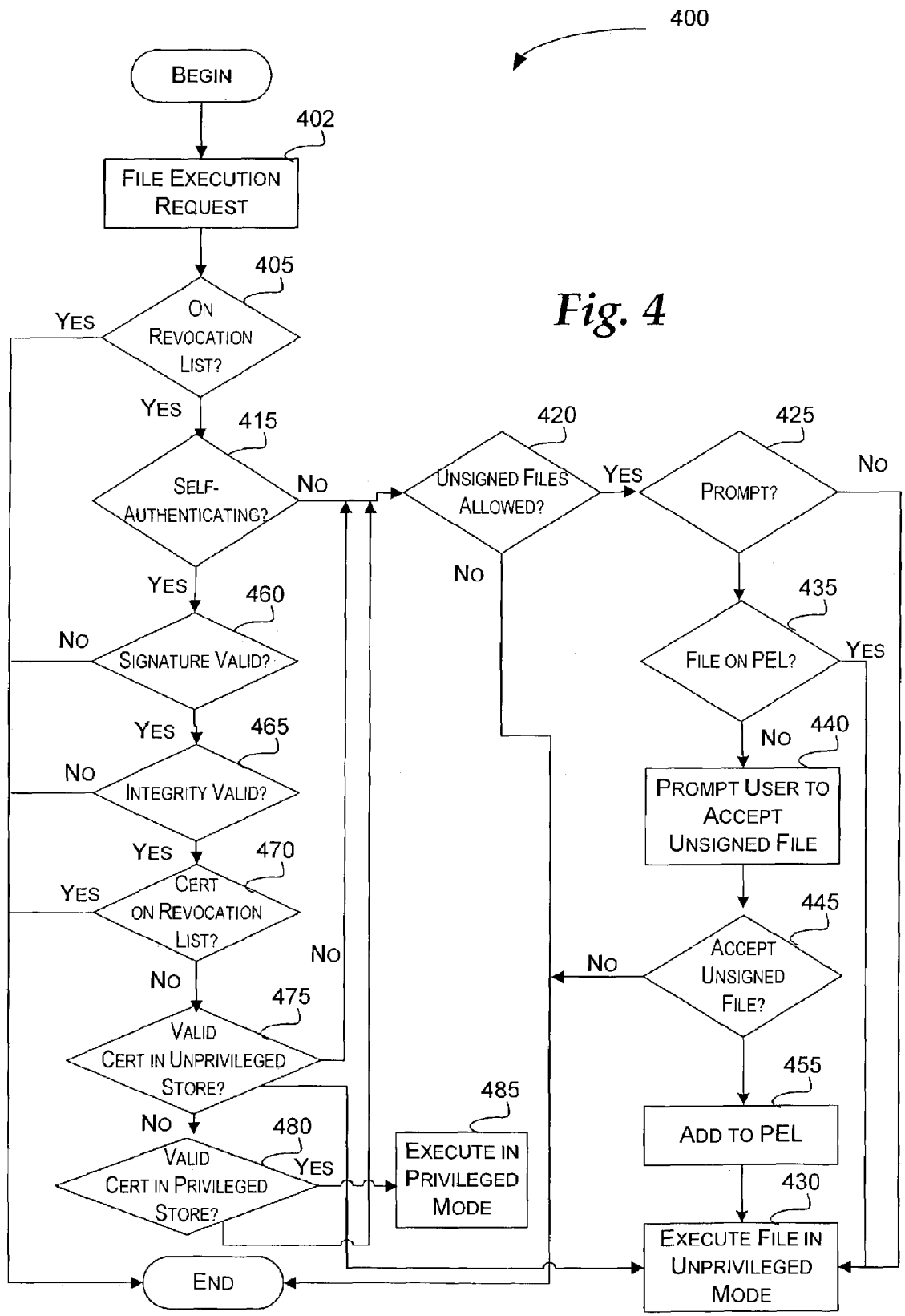
FIG. 4 is a flow chart that generally illustrates a process for executing an installed file of application, in accordance with aspects of the invention.

FIG. 4 is a flow chart that generally illustrates a process for executing an installed file of application, in accordance with aspects of the invention. At step 402, a request is made to run an executable file. At decision block 405, a hash of the file (signed or unsigned) is checked against a revocation list. If the hash of the file is on the revocation list, execution fails and moves to an end block. If the hash is not in the revocation list, decision block 415 determines if the file is self-authenticating, such as by digital signature and/or certificate. If not, the process continues to decision block 420. If the file is self-authenticating, the processes continue to decision block 460.

At decision block 420, a determination is made whether unsigned files are allowed. If not, the execution fails and the process moves to an end block. If unsigned files are allowed, the process continues to decision block 425.

At decision block 425, a determination is made whether the user should be prompted to accept the execution despite the fact that the file is not authenticated. This determination may be made by checking a setting or the like. If prompting is disabled, the file is executed in unprivileged mode at block 430. However, if user prompting is enabled, the process continues to decision block 435.

At decision block 435, a determination is made whether the hash of the file is on the PEL. If the hash is on the PEL, the user has previously accepted the file an no prompting is required. Thus, the file is executed in unprivileged mode at block 430 without prompting the user. If the hash is not on the PEL, then, at block 440, the user is prompted to accept the unsigned file. If the user rejects the unsigned file, execution fails and moves to an end block. If the user accepts the unsigned file, the hash of the file is added to the PEL at block 255. The file is then executed in unprivileged mode at block 430.

Returning to decision block 415, if the file is self-authenticating, the process continues to decision block 460 where the signature's validity is verified. If the signature is not valid, execution fails and moves to an end block. If the signature is valid, the file's integrity is checked at block 465 as described above. If the hashes are different, the file has been tampered with and execution fails and moves to an end block. If the hashes are identical, the file remains intact and the process continues to decision block 470.

At decision block 470, a determination is made whether the certificate hash is on the security revocation list. If the certificate has been revoked, execution fails and moves to an end block. If the certificate has not been revoked, decision block 475 checks the chain of certificates in the signature against the unprivileged store. If a match is found, the file is executed in unprivileged mode at block 430. If a match is not found in the unprivileged store, then decision block 480 checks if a valid certificate is in the privileged store. If a match of the certificate is found, the file is executed in privileged mode at block 485. If the privileged store is empty or a match is not encountered, the file is treated as an unsigned file and the process returns to decision block 420, at which the process continues as described above.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for validating an action associated with an unauthenticated computer application, the method comprising:
   receiving the action associated with the unauthenticated computer application;
   determining whether the unauthenticated computer application is registered with a revocation list, wherein the revocation list includes a list of applications that are prohibited from installation;
   when the unauthenticated computer application is registered with the revocation list, failing the action without prompting;
   when the unauthenticated computer application is not registered with the revocation list, determining whether a recognized certificate is associated with the unauthenticated computer application,
      when a recognized certificate is associated with the unauthenticated computer application, determining whether the certificate is valid,
         when the certificate is valid, performing the action, and
         when the certificate is not valid, failing the action;
   when a recognized certificate is not associated with the unauthenticated computer application, accessing a prompt exclusion list, wherein the prompt exclusion list includes a list of hashes associated with applications, and determining whether a hash of the unauthenticated computer application matches a hash of the list of hashes;
      when the hash of the unauthenticated computer application matches a hash of the list of hashes,
         performing the action without prompting, and
      when the hash of the unauthenticated computer application does not match a hash of the list of hashes,
         prompting,
            performing the action and adding a hash of the unauthenticated computer application to the prompt exclusion list when an accept user input is received, and
            failing the action and adding the unauthenticated computer application to the revocation list when a deny user input is received.

2. The computer-implemented method of claim 1, wherein the action includes at least one member of a group comprising: an application install action and an application execution action.

3. The computer-implemented method of claim 1, wherein the unauthenticated computer includes a CAB file that inclueds autenticated data and unauthenticated data.

4. The computer implemented method of claim 3, wherein determining whether the unauthenticated computer application is registered with a prompt execution list includes determining whether the unauthenticated data is registered with a prompt execution list.

5. The computer-implemented method of claim 4, further comprising a rollack operation when an acceptance prompt is rejected in association with the unauthenticated data.

6. A computer-readable storage medium having computer-executable instructions for validating an action associated with an unauthenticated computer application, the instructions comprising:
   receiving the action associated with the unauthenticated computer application;
   determining whether the unauthenticated computer application is registered with a revocation list, wherein the revocation list includes a list of applications that are prohibited from installation;
   when the unauthenticated computer application is registered with the revocation list,
      failing the action without prompting;
   when the unauthenticated computer application is not registered with the revocation list, determining whether a recognized certificate is associated with the unauthenticated computer application,
      when a recognized certificate is associated with the unauthenticated computer application, determining whether the certificate is valid,
         when the certificate is valid, performing the action, and
         when the certificate is not valid, failing the action;
   when a recognized certificate is not associated with the unauthenticated computer application, accessing a prompt exclusion list, wherein the prompt exclusion list includes a list of hashes associated with applications, and determining whether a hash of the unauthenticated computer application matches a hash of the list of hashes;
      when the hash of the unauthenticated computer application matches a hash of the list of hashes,
         performing the action without prompting, and
      when the hash of the unauthenticated computer application does not match a hash of the list of hashes,
         prompting,
            performing the action and adding a hash of the unauthenticated computer application to the prompt exclusion list when an accept user input is received, and
            failing the action and adding the unauthenticated computer application to the revocation list when a deny user input is received.

7. The computer-readable storage medium of claim 6, wherein the unauthenticated computer application includes a CAB file that includes authenticated data and unauthenticated data.

8. The computer-readable storage medium of claim 7, further comprising a rollback operation when an acceptance prompt is rejected in associaion with the unauthenticated data.

9. The computer-readable storage medium of claim 7, wherein determining whether the unauthenticated computer application is registered with a prompt exclusion list includes determining whether the unauthenticated data is registered with a prompt exclusion list.

10. The computer-readable storage medium of claim 6, wherein the action includes at least one member of a group comprising: an application install action and an application execution action.

11. A system for validating an installation action associated with an unauthenticated computer application, the system comprising:
    a processor;

a computer-readable storage medium having instructions for execution on the processor, which causes the processor to perform a method of:

receiving the installation action associated with the unauthenticated computer application;

determining whether the unauthenticated computer application is registered with a revocation list, wherein the revocation list includes a list of applications that are prohibited from installation;

when the unauthenticated computer application is registered with the revocation list, failing the installation action without prompting;

when the unauthenticated computer application is not registered with the revocation list, determining whether a recognized certificate is associated with the unauthenticated computer application, when a recognized certificate is associated with the unauthenticated computer application, determining whether the certificate is valid, when the certificate is valid, performing the installation action, and when the certificate is not valid, failing the installation action;

when a recognized certificate is not associated with the unauthenticated computer application, accessing a prompt exclusion list, wherein the prompt exclusion list includes a list of hashes associated with applications of the system, and determining whether a hash of the unauthenticated computer application matches a hash of the list of hashes;

when the hash of the unauthenticated computer application matches a hash of the list of hashes, performing the installation action without prompting, and when the hash of the unauthenticated computer application does not match a hash of the list of hashes, prompting, performing the installation action and adding a hash of the unauthenticated computer application to the prompt exclusion list when an accept user input is received, and failing the installation action and adding the unauthenticated computer application to the revocation list when a deny user input is received.

12. The system of claim 11, wherein the unauthenticated computer application includes a CAB file that includes authenticated data and unauthenticated data.

13. The system of claim 12, wherein determining whether the unauthenticated computer application is registered with a prompt exclusion list includes determining whether the unauthenticated data is registered with a prompt exclusion list.

14. The system of claim 13, further comprising a rollback operation when an acceptance prompt is rejected in association with the unauthenticated data.

* * * * *